United States Patent
Hart et al.

(10) Patent No.: US 10,307,012 B2
(45) Date of Patent: Jun. 4, 2019

(54) SPRAY HEAD ASSEMBLY WITH INTERIOR RISES, DEPRESSIONS, AND ORIFICES

(71) Applicant: BUNN-O-MATIC CORPORATION, Springfield, IL (US)

(72) Inventors: Burton L. Hart, Springfield, IL (US); Randy D. Pope, Springfield, IL (US); William H. Thomas, Springfield, IL (US)

(73) Assignee: BUNN-O-MATIC CORPORATION, Springfield, IL (US)

( * ) Notice: Subject to any disclaimer, the term of this patent is extended or adjusted under 35 U.S.C. 154(b) by 343 days.

(21) Appl. No.: 14/776,487

(22) PCT Filed: Mar. 14, 2014

(86) PCT No.: PCT/US2014/028734
§ 371 (c)(1),
(2) Date: Sep. 14, 2015

(87) PCT Pub. No.: WO2014/153024
PCT Pub. Date: Sep. 25, 2014

(65) Prior Publication Data
US 2016/0029834 A1    Feb. 4, 2016

Related U.S. Application Data

(60) Provisional application No. 61/785,141, filed on Mar. 14, 2013.

(51) Int. Cl.
*B05B 1/18* (2006.01)
*A47J 31/44* (2006.01)
*A47J 31/46* (2006.01)

(52) U.S. Cl.
CPC .......... *A47J 31/46* (2013.01); *A47J 31/4478* (2013.01); *B05B 1/185* (2013.01)

(58) Field of Classification Search
CPC ........ A47J 31/4478; A47J 31/46; B05B 1/185
USPC .......... 99/281, 282, 289, 300, 307; 239/114, 239/533.14, 558
See application file for complete search history.

(56) References Cited

U.S. PATENT DOCUMENTS

| | | | | |
|---|---|---|---|---|
| 1,763,863 | A | * | 6/1930 | Richheimer ............ A47J 31/06 210/455 |
| 3,451,330 | A | | 6/1969 | Bender |
| 3,952,642 | A | | 4/1976 | Vitous |
| 6,755,119 | B1 | | 6/2004 | Lyall et al. |
| 7,669,519 | B2 | | 3/2010 | Pope et al. |
| 2009/0226585 | A1 | | 9/2009 | Wroblewski |
| 2011/0094393 | A1 | | 4/2011 | Clark et al. |

OTHER PUBLICATIONS

Search Report and Written Opinion issued in App. No. PCT/US2014/028734 (dated 2014).

* cited by examiner

*Primary Examiner* — Thien S Tran
(74) *Attorney, Agent, or Firm* — Barnes & Thornburg LLP

(57) ABSTRACT

The present disclosure relates to a spray head assembly for a beverage making machine comprising a mounting for connection to a flow of liquid from a reservoir or other water source and a surface for joining to a spray head. A face portion of the spray head has an interior surface with relative rises and depressions or hills and valleys. Orifices are located generally at the peak of a hill with valleys being defined between neighboring hills.

10 Claims, 5 Drawing Sheets

SPRAY HEAD ASSEMBLY WITH INTERIOR RISES, DEPRESSIONS, AND ORIFICES

CROSS REFERENCE TO RELATED APPLICATIONS

This application is a U.S. nationalization under 35 U.S.C. § 371 of International Application No. PCT/US2014/028734, filed Mar. 14, 2014, which claims the benefit of priority under 35 U.S.C. § 119(e) to United States Provisional Patent Application No. 61/785,141, filed Mar. 14, 2013. The disclosures set forth in the referenced applications are incorporated herein by reference in their entirety.

BACKGROUND

The present invention concerns an apparatus and a method for reducing the build-up of unwanted residue or particles from water in and around orifices in a spray head assembly of a beverage making machine.

In one embodiment of a beverage making machine, water for making beverage enters the beverage making system through a pressurized line which includes at least a controllable inlet valve. Lime or other mineral deposits tend to accumulate or accrete on the inside of a heated water system and on flat surfaces where the water can evaporate. Sometimes particles of minerals or other materials can be introduced to the beverage making system form upstream in the water source. This action and accumulation may be accelerated in heated areas of the system and lines transporting hot water. Beverage making systems often use heated water for the brewing process and may have a heated water reservoir as one of the components of the system.

While these particles and accumulated material can be removed, it may clog and otherwise interfere with the expected flow of water and the operation of the beverage making equipment. Some surfaces might not be easily cleaned because they are not easily accessible and/or are not designed to accept a cleaning device such as a cleaning cloth, brush, scouring pad, etc. Accordingly, it is difficult and time consuming to remove lime and/or other mineral deposits in a heated water system for beverage brewing apparatus.

The present disclosure relates to an apparatus and method for producing beverages which includes controllably dispensing water for use in brewing while minimizing lime deposits, particles and other build-up.

Water with high lime content or other minerals that is allowed to evaporate in a flat plane over the spray-holes of a spray head portion will begin to form in and around the spray head holes or orifices that brew water passes through to enter a brewing funnel positioned below the spray head. Over time the deposits can accrete or grow and result in reduced flow through the spray head orifices, affecting the designed flow rate and patterns of the water and affect the quality of the resultant brewed beverage. To avoid undesired build-up of such material, spray heads must be routinely cleaned, creating an undesirable operational requirement. That is, cleaning of such unwanted material requires time and cleaning materials both of which increase the cost of maintaining the brewing system.

The present disclosure minimizes or does not allow residual water inside a spray head to dry (or evaporate) over the spray head orifices.

The present disclosure provides depressions in which the residual water can reside at the end of a brewing cycle, preventing or minimizing the water from drying/evaporating on top of the orifices.

The present disclosure provides depressions to allow particles carried in the water flow through the spray head assembly to collect and reduce the likelihood that the particles will become lodged in the orifices which are spaced away from the depressions.

Additional features and embodiments will become apparent to those skilled in the art upon consideration of the following detailed description of drawings.

BRIEF DESCRIPTION OF THE DRAWINGS

The present invention will now be described in connection with one or more drawings, in which.

DETAILED DESCRIPTION

Figure 1:
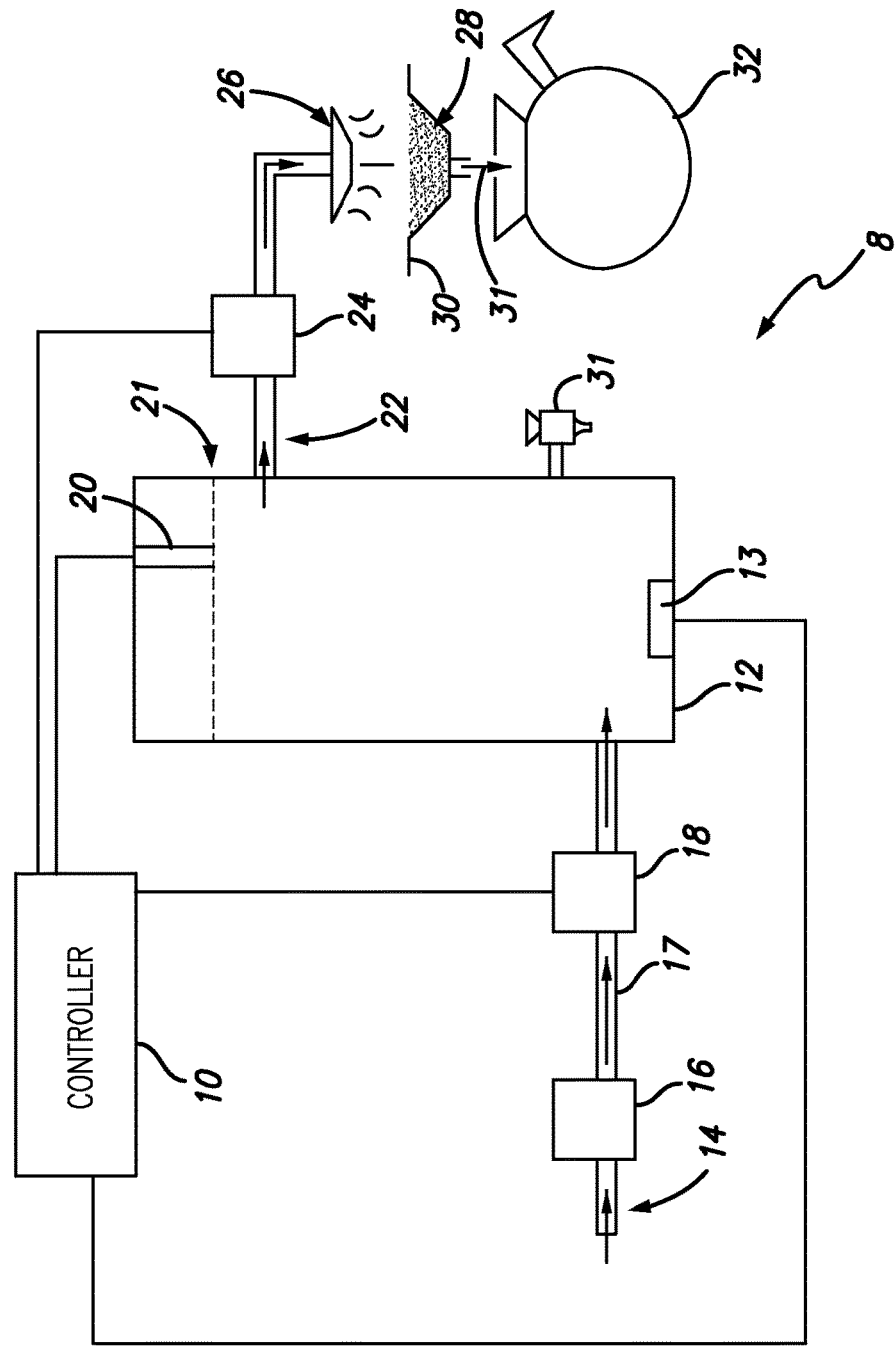
FIG. 1 is a simplified diagram of beverage making apparatus using a spray head assembly in the process for making beverage.

While the present disclosure may be susceptible to embodiment in different forms, there is shown in the drawings, and described herein in detail, embodiments with the understanding that the present description is an exemplification of the principles of the disclosure and is not intended to be exhaustive or to limit the disclosure to the details of construction and the arrangements of components set forth in the following description and illustrated in the drawings. The present invention is described in connection with one or more contemplated embodiments which are not intended to be limiting of the scope of the present invention. The present invention is intended to encompass those embodiments as well as equivalents and variations.

Terms including beverage, brewed, brewing, and brewed beverage as may be used herein are intended to be broadly defined as including, but not limited to the brewing or making of tea, coffee and any other beverages or food substances that will benefit from the present disclosure. This broad interpretation is also intended to include, but be limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze-dried or other forms of materials including liquid, gel, crystal or other form of beverage or food materials to obtain a desired beverage or food product. This broad interpretation is further intended to include, without limitation; at least funnel and filter-type, packet or pouch-type, pod-type or other pre-packaged or unpackaged forms of retaining and brewing a beverage or making of a food product. The terms heated water may be interpreted as hot water, and generally refers to adding energy to water to heat the water above ambient temperature.

FIG. 1 shows a beverage making apparatus 8 including a controller 10 coupled to various components or controllable devices associated with an inlet liquid or water delivery assembly which may include a liquid reservoir 12 and which controls or receives information from at least a portion of a beverage maker that is associated with the apparatus 8. When beverage making apparatus 8 is used to make a heated beverage, such as coffee, tea, or soup, liquid reservoir 12 may include a heater, such as heating element 13 associated therewith to heat the liquid (water) to a desired temperature. For making coffee and tea the water in liquid reservoir 12 will be heated at a temperature approaching boiling, e.g., about 185-212° F. Such a heating element is coupled and controlled by controller 10. A variety of heating methods could be used with such a beverage making device and all versions and variations are considered to be included in this disclosures. Alternatively, for ambient temperature liquid dispensing apparatuses, no heating element may be needed. An inlet tube 14 is coupled to and communicates with liquid reservoir 12 for dispensing liquid into liquid reservoir 12. A flow regulator 16 is coupled with inlet tube 14. Flow regulator 16 maintains a predetermined flow rate for the liquid through entry section 17 toward liquid reservoir 12. Instead of using flow regulator 16, a constant line pressure source (not shown) may be used. Flow regulator 16 may be coupled to controller 10 for controllably adjusting the flow rate when the particular application may so require, or may be operated independently of controller 10. An inlet valve 18 is positioned to communicate with inlet tube 14 between flow regulator 16 and liquid reservoir 12 as shown in FIG. 1. Liquid level sensor 20 senses a level 21 of liquid in the liquid reservoir. All other variations in the beverage making apparatus are considered to be within the scope of this disclosure and the definition of the apparatus is provided by way of illustration and not limitation.

Controller 10 is operable to permit liquid to flow out of reservoir 12 via outlet tube 22. An outlet valve 24 is associated with outlet tube 22 and is coupled to and controllably operated by controller 10. When outlet valve 24 is open, liquid can pass out of outlet tube 22 to a spray head 26 to be distributed over beverage making material 28 positioned in a brew funnel 30 to allow the liquid, for example heated water, to contact the beverage making material, for example coffee grounds, to make a desired beverage such as coffee. The brewed beverage 31 is then passed into a container such as a coffee carafe 32 for distribution and consumption. A faucet 31 may also be provided in association with reservoir 12 for selective dispensing of liquid (e.g., hot water) directly therefrom.

Figure 2:
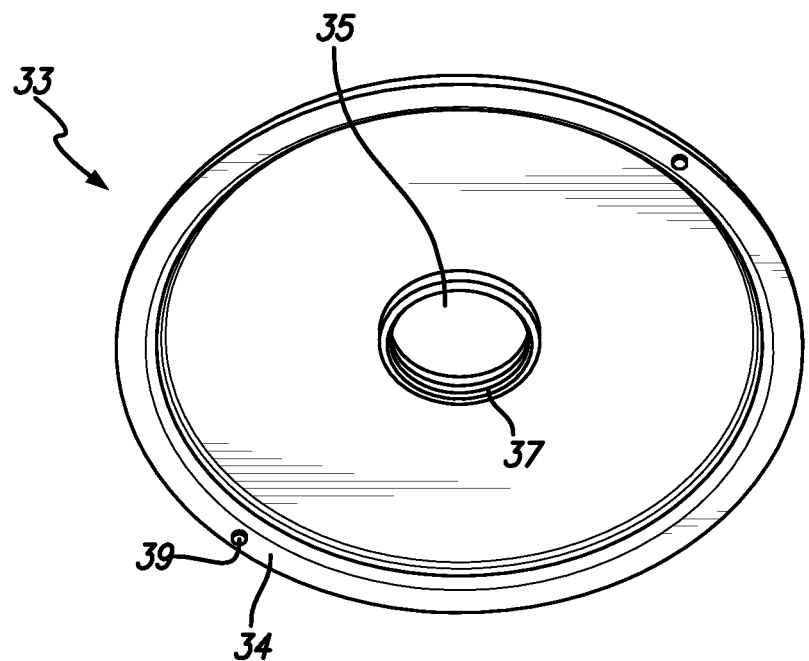
FIG. 2 is a perspective view of an inside face of a mounting portion of the spray head assembly.
Figure 3:
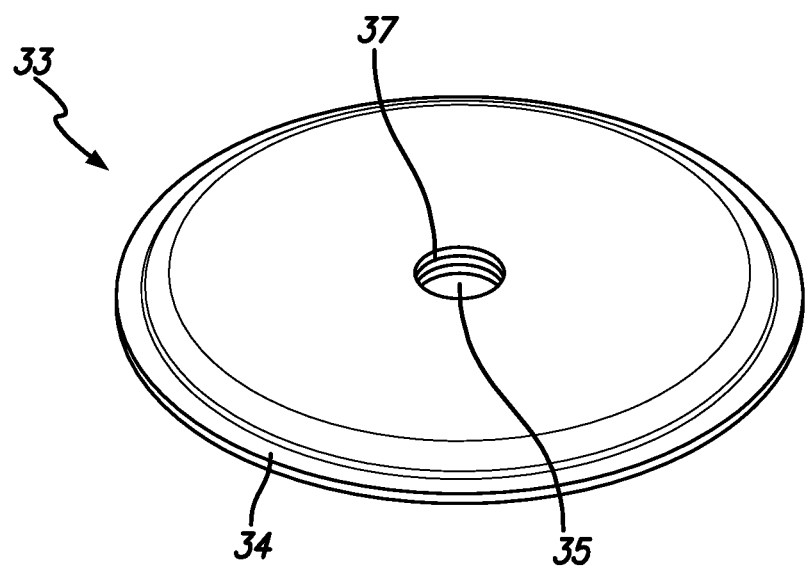
FIG. 3 is a perspective view of an outside face of the mounting portion of the spray head assembly shown in FIG. 2.

FIG. 2 shows the inside surface of the mounting portion 33 of the spray head assembly 26. Mounting portion 33 is generally planar and has a central hole 35 with threads 37 providing connection to outlet tube 22 which has complementary formed threads. Other connection may be provided in place of threads 37 and all forms of connection is considered to be included in this disclosure and not limited by this illustration of the connection as a threaded connection. Mounting portion 33 has protuberances or nubs 39 (two of which are shown) on flange 34 which nubs 39 cooperate with corresponding recesses 29 on the face portion 25 of the spray head portion 26 for assisting with alignment and mating of the face portion of the spray head portion 26 to the mounting 33. FIG. 3 shows the outside surface of the mounting portion 33 shown in FIG. 2.

The mounting portion 33 and the face portion 25 of the spray head assembly 26 can be brought together or joined through several different methods. One example of joining the portions 33, 25 is by use of a gasket as shown in U.S. Pat. No. 7,669,519, assigned to Bunn-O-Matic Corporation and incorporated herein in its entirety by reference. Alternatively, the portions 33, 25 can be brought together during a manufacturing operation in which the two components are bonded together either by way of adhesive, heating, ultrasonic welding, or other methods of joining two pieces of compatible material. The use of the gasket 50 allows the portions to be of dissimilar materials such as metal and plastic which might not be as readily bondable. Additionally, lugs, threads, clips and any number of other ways of connecting the mounting portion 25 and face portion 33 can be used.

Figure 4:
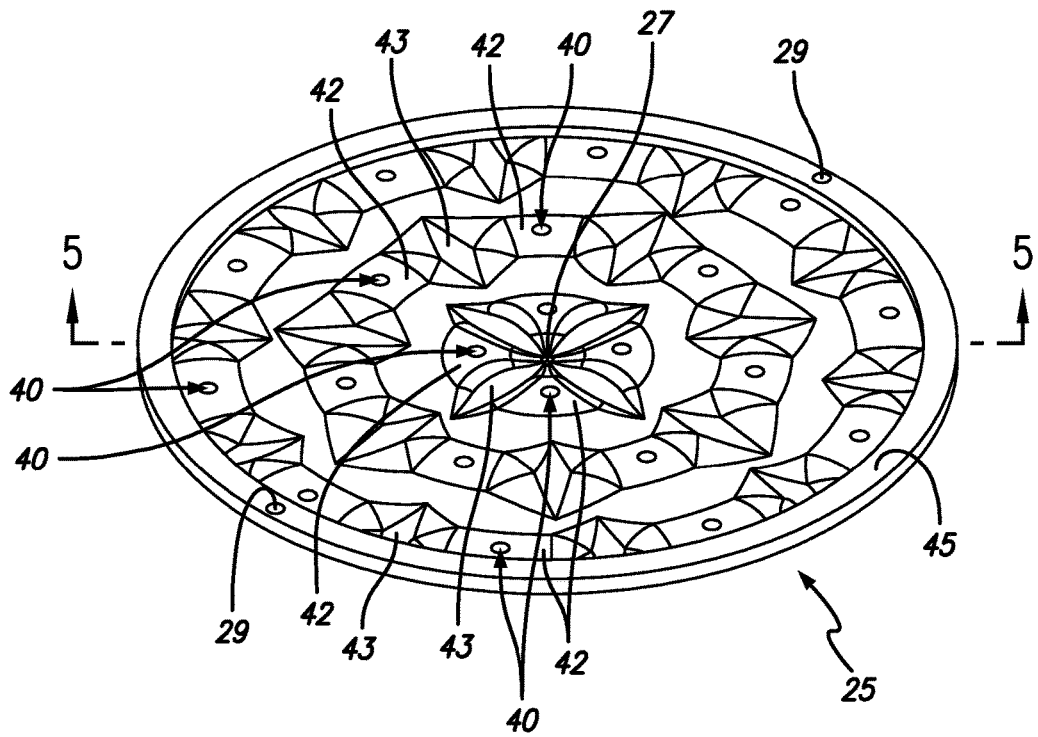
FIG. 4 is a top perspective view of a first embodiment of an inside face of the spray head portion.

FIG. 4 shows the inside or upper surface of spray head 26 having orifices 40. As seen in FIG. 4 spray head 25 has depressions 43 in which residual water can collect or reside, preventing the water from drying/evaporating on top of the orifices 40. The spray head 26 may have a varying number of spray head orifices 40, along with a varying number of orifice diameters, to be utilized for a varying number of brewing requirements.

Figure 5:
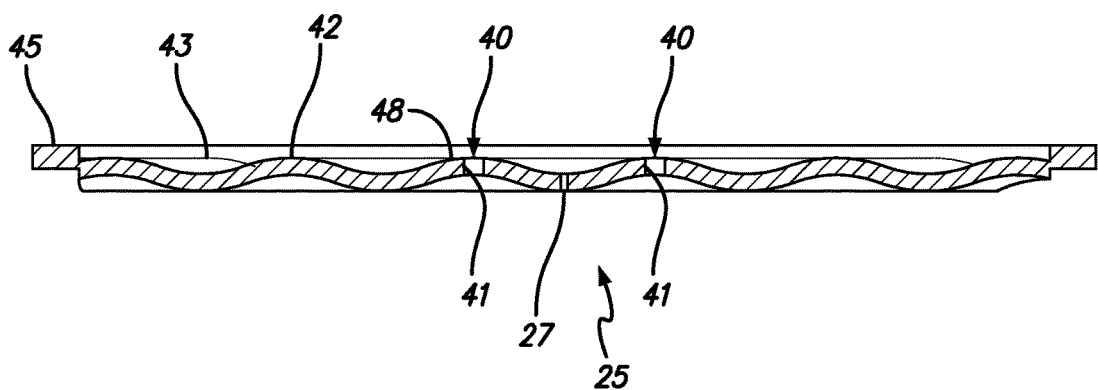
FIG. 5 is a cross-sectional side elevational view of the face of a spray head portion taken along line 5-5 in FIG. 4.

Each orifice 40 has an orifice passageway 41. As best seen in FIG. 5 orifice passage 41 is generally cylindrical although orifice passages of other configurations are contemplated and fully within the scope of this disclosure without limitation. For example, the passages 41 may be conically shaped with a larger portion facing the outside surface of the face portion 25. Alternatively, the passages 41 may be conically shaped with a larger portion facing the inside towards the mounting portion 33. These alternate conical shaped passages 41 may be combined on a single face portion 25 to achieve desired results. The outwardly conical shaped passages 41 may result in a broader distribution of spray over the ground coffee. Similarly, the inwardly conical shaped passages 41 may result in a narrower distribution of spray over the ground coffee as a result of the narrower portion of the cone facing the ground coffee in the funnel positioned there below.

The passages 41 may also be formed with an oval cross section either conical or generally cylindrical. It is possible that the use of oval passages 41 may be oriented in a way so as to provide directional flow of liquid through the oval passage. In this regard, an oval angled passage may be used to provide a directional orientation of the flow of water through the passage. Such angled or oval passages may be used to create a directional flow so as to possibly induce motion, such as swirling, of the water and grounds as a result of the flow of liquid through the oval passage. Alternatively, the directional flow can be oriented in ways so as to provide broader or narrower distribution either as a result of an entire field of oval passages or in combination with other passage forms and/or orientations. As an example, the oval passages could be oriented so as to provide a directional path to reach less saturated areas of the coffee grounds to help improve the overall saturation and efficient extraction of coffee beverage from the coffee grounds. This orientation of such passages may allow the spray water to reach otherwise difficult or unreached spaces of the ground coffee. Additionally, an oval passage might be created using a single straight draw mold pin to help provide an efficient manufacturing process but still providing an oval oriented passage to produce a predetermined effect.

Spray head 26 has a series of rises 42 and depressions 43, or hills and valleys, similar to a generally non-planar surface or a surface approximating a sinusoidal undulating surface. While some of the curved portions in the illustrations appear to be somewhat faceted, it is envisioned that the surfaces may be generally continuously curving as well as faceted. The faceted appearance is merely a drafting expedient to show some variation in the relatively small dimensional variation. The rises 42 and depressions 43 extend in many directions. Orifices 40 are generally located extending through the tops or near to the tops or crests of the rises 42. Depressions 43 provide a location for accumulation of residual water to dry (or evaporate) in a location spaced away from the orifices to reduce or eliminate consequences to the spray head flow rate compared to the prior designs.

The sinusoidal surface features or designs create a unique flow pattern. The gentle rise to the discharge point (orifice) prevents or reduces turbulence inside the spray head assembly allowing for a more uniform flow stream from each orifice and a more uniform flow among the different orifices. The present spray head design was made with attention given to capillary action, or capillarity, which is the ability of a liquid to flow in narrow spaces without the assistance of, and in opposition to external forces like gravity. If the depressions 43 of the spray head 26 are too small, then the combination of surface tension (which is caused by cohesion within the liquid) and adhesive forces between the liquid and the inside surface of the face portion 25 of the spray head 26 may act to lift the liquid into contact with one or more orifices 40. Once the tension associated with the capillary action breaks, the water will be a level below the edge of the orifice 40 preventing the accumulation of mineral deposits along the edge of the orifice 40. Since water is drained away from the edge of the orifice and bridging is reduced or prevented, the design of the face portion 25 of the spray head 26 helps prevent the accumulation and sealing over of the orifice 40. Depressions 43 are sufficiently large to inhibit and/or prevent liquid, e.g., water, from remaining in one or more orifices 40 when the flow to the spray head 26 is stopped.

Additionally, the design of the present spray head structure results in the absence of a generally continuous planar floor surface in the spray head portion. As such, the flow is generally consistent as noted, and facilitates the flow of the capillary action. The absence of a planar floor also prevents bridging of water against abrupt structural boundaries which also prevents the accumulation of mineral deposits in such bridged areas. This helps facilitate draining of water to the lowest area in each depression which controls the location of mineral deposits in a location spaced furthest away from the orifices. The effect of bridging in other spray heads can, over time, cause mineral deposits to form over the passage thereby reducing the flow of water through the passage and altering the brewing process.

Figure 6:
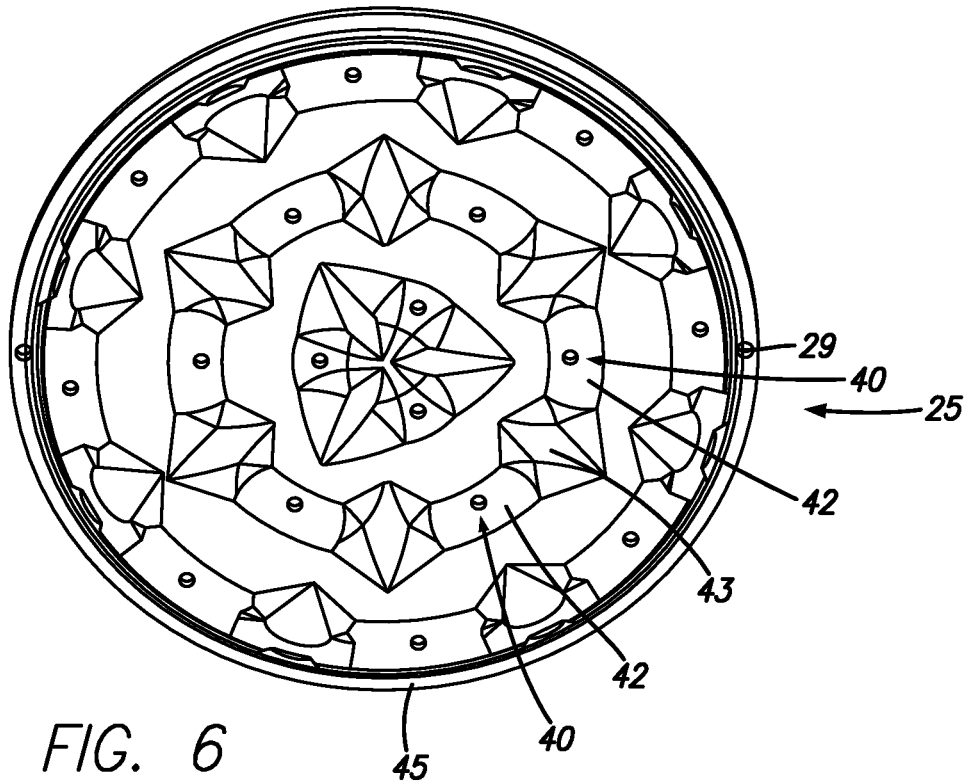
FIG. 6 shows a perspective view of a second embodiment of the inside face of a spray head portion.
Figure 7:
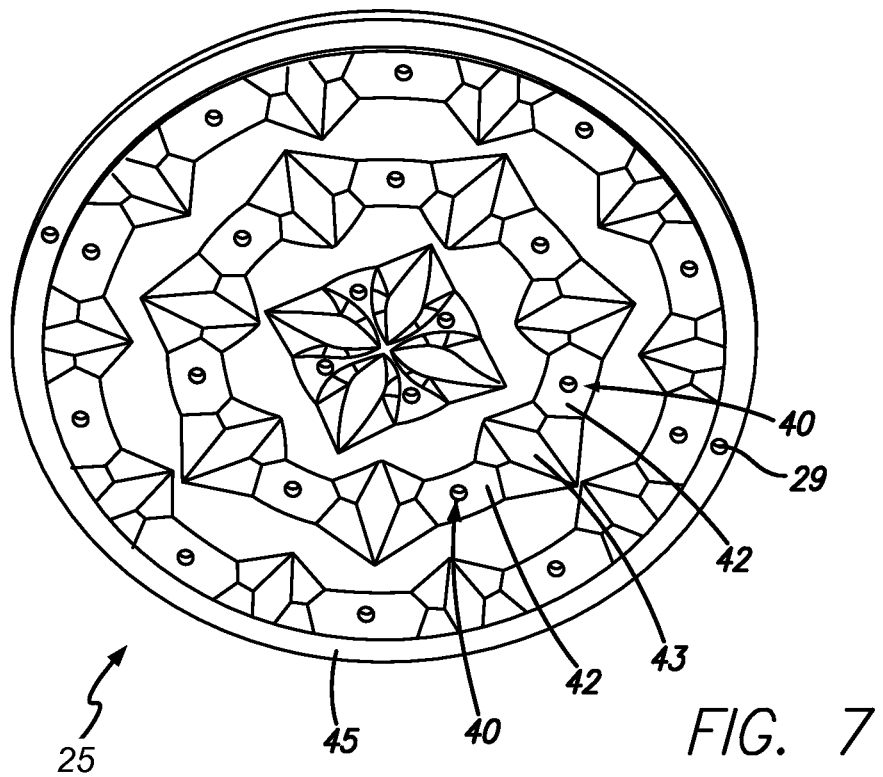
FIG. 7 shows a perspective view of a third embodiment of the inside face of a spray head portion.
Figure 8:
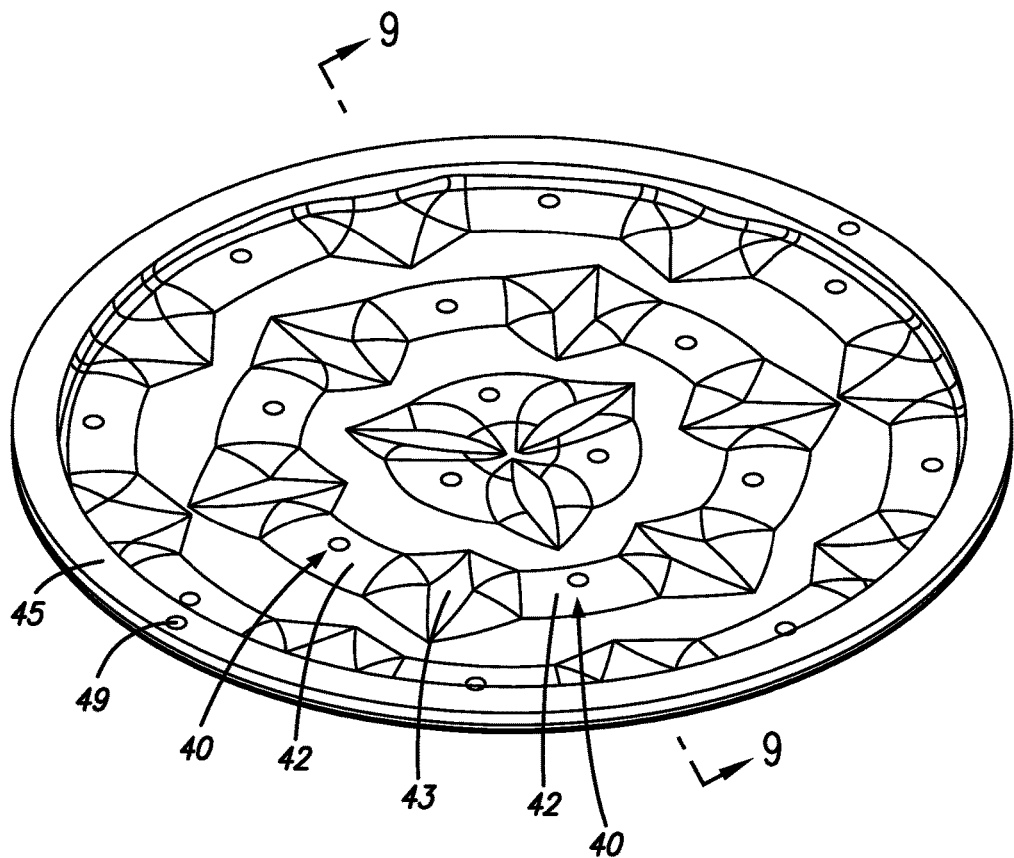
FIG. 8 shows a perspective view of a fourth embodiment of the inside face of a spray head portion.

As seen in FIG. 4, depressions 43 between any two neighboring orifices 40 may be connected to other depressions 43 between two other orifices 40. Not all depressions 43 are connected to each other. In the embodiment shown in FIG. 4 there is an outer connected ring of depressions and an inner connected ring of depressions with each of the orifices 40 being located generally at or near the top of one of the rises. FIGS. 6-8 show different embodiments of the inside of the face portion 25 of the spray head wherein rises 42 and depressions 43 are configured differently from the embodiment of FIG. 2. Additionally, while the rises 42 in depressions 43 may appear to be somewhat faceted in the illustrations, the preferred embodiment of the surface features of the face portion 25 is generally continuous curves. However, it is possible to divide some form of faceted version of the structures extending between the neighboring orifices 40. While it is expected that the generally continuous sinusoidal surfaces will tend to produce a desirable capillary and draining effect, similar effects if not identical effects should be achieved with similarly structured faceted features. Also, surface coatings may be employed to enhance the capillary and draining effects described in the present disclosure.

In another embodiment one or more drain orifices 27 may be provided in a series of connected depressions so that upon ceasing of flow liquid through spray head 26 the depressions will drain through the drain orifice(s) in that connected series of depressions. The drain hole 27 can be positioned to drain into a drain line or the beverage brewing funnel 30 at the end of the brew cycle. In this way only drain orifices 27 are likely to retain any liquid and to collect any residue from evaporated liquid. Such drain orifices 27 further enhance the likelihood that the orifices 40 on the rises 42 will not become clogged with liquid residue and this will extend the working time of the face portion 25 of the spray head. It should be noted that such drain orifice(s) 27 will also convey flow to the beverage making material 28 and when providing drain orifice(s) in the spray head 26 the liquid flow pattern will provide flow through the orifices 40 and through the drain orifice(s) 27 to the beverage making material. It being understood that such liquid flow pattern will change as the drain orifice(s) 27 becomes clogged.

It should be understood that the drain orifice(s) 27 are intended to not contribute to the flow pattern but simply to drain liquid from one or more depressions at the end of a brew cycle. Thus drain orifice(s) 27 may have a passageway that is a smaller diameter or cross sectional area than the passageway 41 in orifice 40 (e.g., will convey less flow or flow at a slower rate) or the drain orifice(s) 27 passageway may be located and directed to convey liquid so that it will not interfere with the desired flow pattern and will, for example, direct flow through that drain orifice toward a surface of the brew funnel 30 rather than toward beverage making material 28. That is, the drain orifice(s) passageway may be directed to cause a flow at an angle generally acute to the general plane of the spray head 26. While mineral deposits may still develop in such a drain hole 27, a single hole may generally be easily cleaned by the use of a probe or other instrument. Such a hole could be easily marked on the outside surface of the spray head so as to indicate to the user where such cleaning is required on a periodic basis. Such a drain hole 27 would facilitate the draining of fluid from the depressions 43 at the end of a brewing cycle to provide even further reduction of mineral deposits with in the depressions 43.

By providing depressions 43 the problem of lime or other mineral tending to deposit in the orifices 40 is reduced or eliminated. The problem of mineral accumulation can be exacerbated by the use of heated water, which tends to increase the rate of mineral accretion. Cleaning of the orifices 40 is generally only practical in an easy efficient manner by removal of the spray head 26 and cleaning of the orifices 40. In this regard, the spray head 26 is preferably made of thermoplastic which tends not to accumulate water except in the depressions 43. The use of thermoplastic also makes disassembly and reassembly of the spray head 26 easier.

Figure 9:
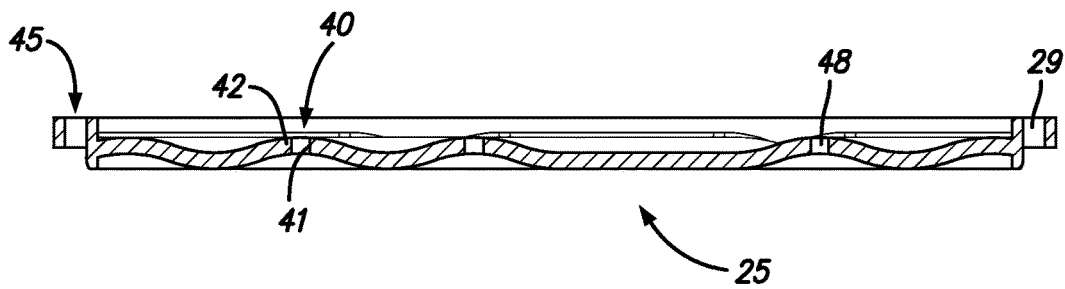
FIG. 9 is a cross-sectional side elevational view of the face of a spray head portion taken along line 9-9 in FIG. 8.

A cross-section of the face portion of the spray head 25 is shown in FIG. 5, as taken along line 5-5 in FIG. 4, wherein the depressions 43 and rises 42 are evident. Each orifice 40 has a passageway 41 which as seen in FIG. 5 is generally cylindrical in shape with the axis of each cylinder being generally perpendicular to the general plane of the spray head 25. Also seen in FIG. 5 is mating flange 45 which extends around the periphery of spray head 25 and which is sized to mate in a face-to-face relation with flange 34 of the mounting bracket 33. Peripheral mating flange 45 has holes 29 (two of which are shown) for mating with nubs 39 of mounting bracket 33 for assisting with mating of the spray head 26 to the mounting bracket 33. FIG. 9 shows a cross-sectional view of another embodiment of the face of a spray head.

FIG. 7 shows a perspective view of the spray head portion of a spray head assembly 60 (with the gasket connected version shown in U.S. Pat. No. 7,669,519, assigned to Bunn-O-Matic Corporation and incorporated herein in its entirety by reference). As is evident from FIG. 1 the spray head 26 is operable when it is in a generally horizontal position. During beverage making liquid (e.g., water) flows through outlet tube 22, into spray head assembly 60, outward through orifices 40 and into beverage making material 28. During longer periods between making beverage residual liquid (e.g., water) will drain from the rises 42 into the depressions 43 and may evaporate leaving residue (e.g., lime, particles, and other minerals) in the depressions. When beverage making is resumed the residue in the depressions will not interfere with flow of the liquid through orifices 40. Without the rise and depression configuration liquid (e.g., water) would tend to remain in orifices 40 as described above whereupon evaporation would leave unwanted deposits in or abutting the orifices 40 with undesired flow consequences when beverage making is resumed.

As seen in the Figures, the rises 42 may have rise edges 48 which tend to break the surface tension of the water to enhance the liquid flow off of the rise into a depression after ceasing flow of the liquid through the three-piece spray head assembly 60. In FIG. 5 the rise edges 48 may not be evident. Rises 42 may omit edges 48 whereby the slope of the rise 42 into a depression 43 will enhance the liquid flow off of the rise 42 upon ceasing flow of the liquid through the three-piece spray head assembly.

The foregoing terms as well as other terms should be broadly interpreted throughout this application to include all known as well as all hereafter discovered versions, equivalents, variations and other forms of the abovementioned terms as well as other terms.

The present disclosure is intended to be broadly interpreted and not limited. While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

What is claimed is:

1. A spray head assembly for use in a beverage making machine for distributing water over and into a funnel retaining beverage making material, the spray head comprising:
   a first piece having a mounting portion having a periphery, a hole, and a connection to a flow of liquid;
   a second piece having a face portion on one side there of having a periphery, an inside surface on a side of the second piece opposite the face portion, a plurality of cylindrical orifices extending from the face portion to the inside surface, the inside surface having a plurality of spaced apart rises and surrounding, connected depressions with each of the orifices being located at a top of and extending through corresponding rises on the inside surface, the rises and depressions form a generally curved sinusoidal surface extending from the top of a rise, down though surrounding depressions, and up to a neighboring rise for reducing turbulence in the spray head assembly,
   the depressions being in connected communication so that water can flow among the rises and depressions, and
   the first piece being sealably attachable to the second piece defining a cavity there between so that liquid enters the spray head assembly cavity and only exits though the orifice in the top portion of the corresponding rises.

2. The spray head assembly of claim 1, wherein the spray head is generally horizontally oriented when in use whereby liquid remaining on the face portion after ceasing flow of liquid through the spray head assembly can collect in the depressions and residue from evaporated liquid or particles may accumulate in the depressions and not in the orifices.

3. The spray head assembly of claim 1, wherein the rises on the inside surface have edges facilitating draining of the liquid to the connected depressions.

4. The spray head assembly of claim 1, wherein the at least a portion of the periphery of the first piece includes a flange, at least a portion of the periphery of the second piece includes a flange, and the first piece flange and the second piece flange are adapted to abut and close a volume between the first piece and the second piece to substantially direct flow through the orifices in the second piece.

5. The spray head assembly of claim 4, wherein the first piece flange has one of protuberances and recesses and the second piece flange has complementary protuberances and recesses located to correspond with the protuberances and recesses on the first piece for promoting aligning the first piece flange with the second piece flange.

6. The spray head assembly of claim 1, wherein at least one of the plurality of orifices defines a generally cylindrical passageway.

7. The spray head assembly of claim 6, wherein the second piece defines a general plane and the at least one of the plurality of orifices has a cylindrical axis generally perpendicular to the general plane of the second piece.

8. The spray head assembly of claim 1, wherein at least one of the rises has an edge which enhances the liquid flow generally away from the at least one of the rises into at least one of a neighboring connected depressions after ceasing flow of the liquid through the spray head assembly.

9. A spray head assembly for use in a beverage making machine for distributing water over and into a funnel retaining beverage making material, the spray head comprising:
   a mounting having a periphery, a hole, and a connection to a controllable source of liquid from the beverage making machine and a surface for joining to a face portion;

a face portion having a periphery, an inside surface with a plurality of cylindrical orifices extending there through, the inside surface having a plurality of spaced apart rises and surrounding, connected depressions with each of the orifices being located at a top potion of a corresponding rise and extending through the corresponding rise, the rises and depressions form a generally curved sinusoidal surface extending from the top of a rise, down though surrounding depressions, and up to a neighboring rise for reducing turbulence in the spray head assembly, the depressions being in connected communication so that water can flow among the rises and depressions;

the mounting sealably connected to the face portion defining a cavity there between so that liquid enter the spray head assembly cavity and only exits though the orifice in the top portion of the corresponding rises; and structure for connecting the mounting to the outlet to accept liquid into the spray head assembly through the hole and dispense the liquid from the spray head assembly through the orifices and retaining the spray head assembly to substantially direct flow through the orifices, and wherein material and particles from the liquid on the face portion will accumulate in the connected depressions spaced apart from the orifices.

10. A beverage making machine comprising:

a liquid source adapted to provide liquid for making a beverage;

an outlet coupled to the liquid source in a manner for conveying liquid from the liquid source;

a beverage making material retainer adapted to contain beverage making material;

a spray head assembly coupled to the outlet for distributing water over and into beverage making material held in the beverage making material retainer, the spray head assembly having a mounting having a periphery, a hole, a surface for joining to a face portion, and connection to the outlet enabling flow of liquid from the reservoir to the spray head assembly, a face portion having a periphery, a surface with a plurality of cylindrical orifices extending there through, the surface having a plurality of spaced apart rises and surrounding, connected depressions with the orifices being located at a top portion of a corresponding rise and extending through the corresponding rise, the rises and depressions form a generally curved sinusoidal surface extending from the top of a rise, down though surrounding depressions, and up to a neighboring rise for reducing turbulence in the spray head assembly, the depressions being in connected communication so that water can flow among the rises and depressions, a holder for coupling the mounting and face portion to define a cavity there between so that liquid enters the spray head assembly cavity through the hole in the mounting and exits the spray head assembly cavity only through the orifice in the top portion of the corresponding rises, and structure for connecting the mounting to the outlet to retain the spray head assembly to receive water from the outlet and substantially direct flow through the orifices, and wherein material and particles from the liquid on the face portion will accumulate in the connected depressions spaced apart from the orifices.

* * * * *